United States Patent
Stamires et al.

(10) Patent No.: US 7,008,896 B2
(45) Date of Patent: Mar. 7, 2006

(54) SITU FORMED ANIONIC CLAY-CONTAINING BODIES

(75) Inventors: Dennis Stamires, Newport Beach, CA (US); William Jones, Cambridge (GB); Paul O'Connor, Hoevelaken (NL)

(73) Assignee: Akzo Nobel NV, The Netherlands (NL)

( * ) Notice: Subject to any disclaimer, the term of this patent is extended or adjusted under 35 U.S.C. 154(b) by 747 days.

(21) Appl. No.: 10/066,078

(22) Filed: Jan. 31, 2002

(65) Prior Publication Data

US 2002/0092812 A1 Jul. 18, 2002

Related U.S. Application Data

(60) Provisional application No. 60/267,471, filed on Feb. 9, 2001.

(30) Foreign Application Priority Data

Mar. 5, 2001 (EP) ............................................ 01200834

(51) Int. Cl.
*B01J 21/16* (2006.01)

(52) U.S. Cl. ........................... 502/80; 502/526; 502/63; 502/76; 502/84; 502/414; 502/407; 502/515; 502/516; 502/517

(58) Field of Classification Search ................... 502/80, 502/526, 63, 76, 84, 414, 407, 515, 516, 502/517
See application file for complete search history.

(56) References Cited

U.S. PATENT DOCUMENTS

| | | | |
|---|---|---|---|
| 4,454,244 A | 6/1984 | Woltermann | 502/208 |
| 4,866,019 A | 9/1989 | Van Broekhoven | 502/65 |
| 4,946,581 A | 8/1990 | Van Broekhoven | 208/120 |
| 4,952,382 A | 8/1990 | Van Broekhoven | 423/244 |

FOREIGN PATENT DOCUMENTS

| | | |
|---|---|---|
| EP | 0 278 535 B1 | 8/1988 |
| WO | 01/12319 A1 | 2/2001 |

OTHER PUBLICATIONS

Lopez–Salinas et al, New Gallium–Substituted Hydrotalcites: $[Mg_{1-x} GA_x (OH)_2](CO_3)_{x/2} \cdot mH_2O$. Journal of Porous Materials vol. 3 pp. 169–174 (1996) no month.
International Search Report for PCT/EP 02/01110; dated Apr. 26, 2002.

*Primary Examiner*—Elizabeth D. Wood
(74) *Attorney, Agent, or Firm*—Louis A. Morris

(57) ABSTRACT

The present invention is directed to a process for the preparation of crystalline anionic clay-containing bodies from sources comprising a trivalent metal source and a divalent metal source comprising the steps of:

a) preparing a precursor mixture containing a liquid, a divalent metal source and/or a trivalent metal source, at least one of them being insoluble in the liquid;

b) shaping the precursor mixture to obtain shaped bodies;

c) optionally thermally treating the shaped bodies; and d) aging the shaped bodies to obtain crystalline anionic clay-containing bodies;

with the proviso that if no divalent or trivalent metal source is present in the precursor mixture of step a), such source is added to the shaped bodies after shaping step b) and before aging step d);

and with the further proviso that the combined use of an aluminium source as the trivalent metal source and a magnesium source as the divalent metal source is excluded. The quintessence of the present invention is that the major part of the final amount of anionic clay is formed after shaping, i.e., in situ in the shaped body. This results in attrition resistant bodies, without the need to add a binder material.

17 Claims, 2 Drawing Sheets

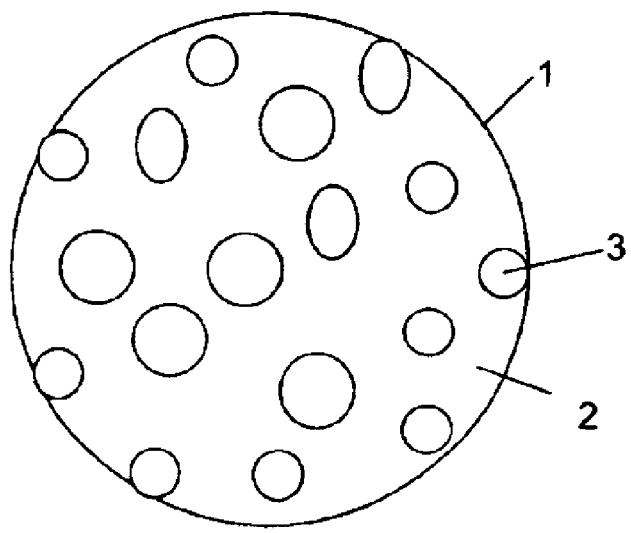
Figure 1. Shaped body according to the invention
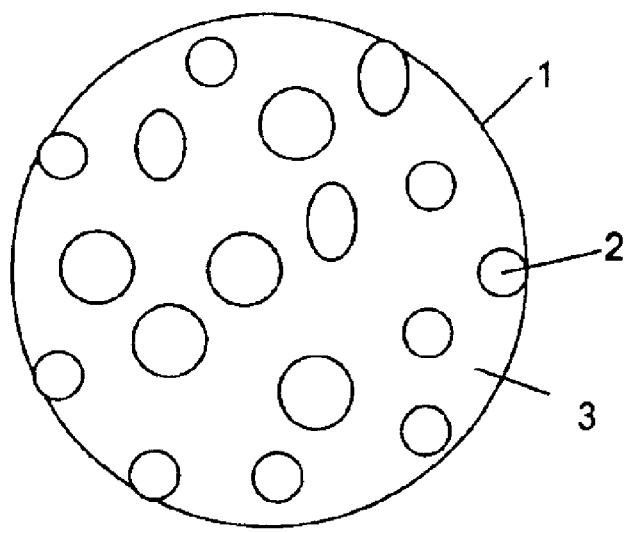
Figure 2. Shaped body according to the prior art

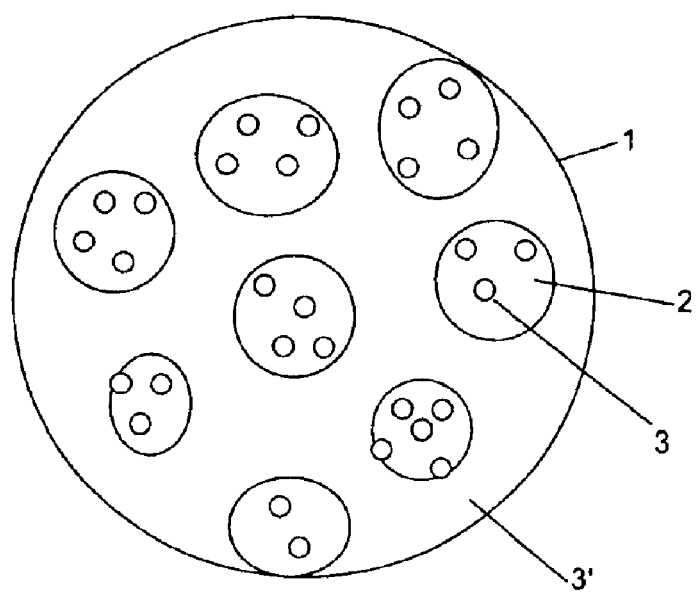
Figure 3. Composite particle comprising shaped bodies according to the invention

SITU FORMED ANIONIC CLAY-CONTAINING BODIES

CROSS REFERENCE TO RELATED APPLICATIONS

This application claims priority from U.S. Provisional Application No. 60/267,471, filed Feb. 7, 2001 and European Patent Application No. 01200834.8, filed Mar. 5, 2001, the entire content of both being incorporated herein.

BACKGROUND OF THE INVENTION

1. Field of the Invention

The present invention pertains to shaped crystalline anionic clay-containing bodies.

2. Prior Art

Examples of crystalline anionic clays include hydrotalcite, meixnerite, sjögrenite, pyroaurite, stichtite, reevesite, eardleyite, manassite, and barbertonite. Crystalline anionic clays have several applications in the catalyst field and as absorbents. For most commercial applications crystalline anionic clays are formed into shaped bodies such as spheres. In all applications where shaped bodies are exposed to severe processing conditions and environments, such as oil refinery applications, separations, purifications, and absorption processes, it is of paramount importance that the integrity of the crystalline anionic clay-containing shaped bodies is kept intact and attrition is prevented.

In the prior art, crystalline anionic clays are usually incorporated into binder or matrix material in order to obtain attrition resistant shaped bodies. Commonly used binder or matrix materials are alumina, and silica. Frequently used alumina precursors are aluminium chlorohydrol, soluble aluminium salts, and acid dispersed pseudo-boehmite; regular silica precursors are silica sols, silicates, silica-alumina co-gels, and combinations thereof.

EP-0 278 535 describes FCC additives or catalyst particles which are prepared by embedding hydrotalcite and optionally zeolite in a silica, silica-alumina or alumina matrix. To this end, hydrotalcite is slurried in a matrix precursor dispersion containing the other catalyst components or precursors thereof and subsequently spray-dried.

However, when crystalline anionic clay is embedded in a matrix, the amount of active crystalline anionic clay contained within the resulting shaped bodies tends to be relatively small. There are applications in which for performance reasons it is desired that the shaped bodies consist or mostly consist of active crystalline anionic clay. Also, by the incorporation of crystalline anionic clay into matrix material, physical properties of the crystalline anionic clay such as specific surface area, pore size distribution, etcetera may be detrimentally affected. Further, the distribution of the crystalline anionic clay within the matrix is difficult to control. Another disadvantage of having to use a matrix to obtain attrition resistant bodies is the fact that most commonly used matrix/binder materials have some chemical activity, which in certain applications can cause undesirable side reactions. For instance, one of the most commonly used binder materials in FCC catalysts and additives is silica or silica based material. These types of binders are not suitable for use in sulphur oxides removal additives, because they detrimentally affect the sulphur removal.

SUMMARY OF THE INVENTION

In one embodiment, the present invention is a process for the preparation of crystalline anionic clay-containing bodies from sources comprising a trivalent metal source and a divalent metal source comprising the steps of:

a) preparing a precursor mixture containing a liquid, a divalent metal source and/or a trivalent metal source, at least one of them being insoluble in the liquid;

b) shaping the precursor mixture to obtain shaped bodies;

c) optionally thermally treating the shaped bodies; and d) aging the shaped bodies to obtain crystalline anionic clay-containing bodies;

with the proviso that if no divalent or trivalent metal source is present in the precursor mixture of step a), such source is added to the shaped bodies after shaping step b) and before aging step d);

and with the further proviso that the combined use of an aluminium source as the trivalent metal source and a magnesium source as the divalent metal source is excluded.

Other embodiments of the invention include the anionic clay-containing bodies made by the above process and their uses.

BRIEF DESCRIPTION OF THE DRAWINGS

FIG. 1 is a schematic view of a shaped body according to the invention

FIG. 2 is a schematic view of a shaped body according to the prior art

FIG. 3 is a schematic view of a composite particle comprising shaped bodies according to the invention.

DETAILED DESCRIPTION OF THE INVENTION

The present invention provides crystalline anionic clay-containing bodies which are attrition resistant without high amounts of binder having to be present and/or added. In fact, crystalline anionic clay-containing bodies are provided which can be binder-free. The crystalline anionic clay distribution within the crystalline anionic clay-containing bodies of the invention can easily be controlled as will be explained further in the description. Within the context of the present specification the term "crystalline anionic clay" means a clay which has an X-ray diffraction pattern containing the specific X-ray diffraction pattern which characterizes the specific type of anionic clay.

The quintessence of the present invention is that crystalline anionic clay is formed after shaping, i.e. in situ in the shaped body. This results in very attrition resistant bodies, without the need to add a binder material. In order to obtain a shaped body a solid precursor must be present in the precursor mixture and it is this context that at least one of the metal sources preferably is an oxide, a hydroxide, a carbonate, or a hydroxy carbonate.

The shaped bodies can be prepared in various ways. In a preferred embodiment of the process a trivalent metal source and a divalent metal source are combined in a slurry to form a precursor mixture. Subsequently, the precursor mixture is shaped. The resulting shaped bodies are aged, optionally after thermal treatment, in a liquid to obtain crystalline anionic clay-containing bodies.

Optionally the precursor mixture is pre-aged prior to the shaping step. This may be advantageous, because during said pre-aging step nuclei may be formed which enhance the formation of the crystalline anionic clay during aging step d) of the above Summary.

It is also possible to prepare a precursor mixture from only one source such as an oxide, hydroxide or carbonate of a trivalent metal source or a divalent metal source, shape it, and then add one or more additional other sources to the shaped bodies in any of the subsequent process steps. During the aging step, the various sources react to give the crystalline anionic clay-containing bodies. It is also possible to use combinations of the two preparation routes described above, for instance: add the trivalent metal source and the divalent metal source to form the precursor mixture, shape to form bodies, and then age the shaped bodies in a liquid containing additional metal source to form anionic clay-containing bodies with a higher content of said additional metal on the outside of the shaped body.

Suitable trivalent metals include aluminium, gallium, indium, iron, chromium, vanadium, cobalt, manganese, cerium, niobium and lanthanum. Aluminium sources include aluminium alkoxide, aluminium oxides and hydroxides such as transition alumina, aluminium trihydrate (gibbsite, bayerite) and its thermally treated forms (including flash-calcined alumina), alumina sols, amorphous alumina, (pseudo)boehmite, aluminium-containing clays such as kaolin, sepiolite, and modified clays such as metakaolin, alumina salts such as aluminium nitrate, aluminium chloride, aluminium chlorohydrate, sodium aluminate, and aluminium sulphate. With the preparation method according to the invention it is also possible to use coarser grades of aluminium trihydrate such as BOC (Bauxite Ore Concentrate) or bauxite.

When clays are used as aluminium source it may be necessary to activate the alumina in the clay by acid treatment—e.g. acid-treated bentonite—, base treatment, thermal treatment, hydrothermal treatment, or combinations thereof. Acid treatment comprises treatment with acids such as nitric acid, acetic acid, phosphoric acid, sulphuric acid, and hydrochloric acid. Thermal treatment is usually performed at temperatures ranging from 30°–1000° C., preferably 200°–800° C., for a time ranging from several minutes to 24 hours, preferably 1–10 hours.

Suitable gallium, indium, iron, chromium, vanadium, cobalt, cerium, niobium, lanthanum and manganese sources are the respective oxides, hydroxides, carbonates, nitrates, chlorides, chlorohydrates, and alkoxides. Also mixtures of the above-mentioned trivalent metal sources can be used, or doped trivalent metal sources. Such doped metal sources are prepared by treatment of a trivalent metal source in the presence of an additive. An example of a doped trivalent metal source is doped boehmite.

If more than one trivalent metal source is used, these metal sources can be combined in the precursor mixture in any sequence.

It is also possible to add a trivalent metal source after the shaping step. In that case, the precursor mixture may or may not already contain a trivalent metal source. If a trivalent metal source is added after the shaping step, it preferably is in liquid when contacted with the shaped bodies. This can be done by dispersing or dissolving the trivalent metal source and adding it to the shaped bodies.

Also other trivalent metal sources than clay, e.g. aluminium trihydrate, may be pre-treated prior to the addition to the precursor mixture or prior to contacting it with the shaped bodies. Said pre-treatment may involve treatment with acid, treatment with base, thermal and/or hydrothermal treatment, all optionally in the presence of seeds.

It is not necessary to convert all of the trivalent metal source into crystalline anionic clay. For instance, any excess of aluminium source will be converted into alumina (usually in the form of transition alumina such as γ-alumina or (crystalline) boehmite) during the aging step. These compounds improve the binding within the shaped bodies and may also impart additional desirable functionalities to the bodies. For instance, alumina provides acid sites for catalytic cracking and (crystalline) boehmite also improves the nickel encapsulation capacity of the shaped bodies. The formation of (crystalline) boehmite may be promoted by adding seeds, either in the precursor mixture, in the aluminium source or during aging.

Suitable divalent metal sources include magnesium, zinc, nickel, copper, iron, cobalt, manganese, calcium, and barium.

Suitable magnesium sources are oxides or hydroxides such as MgO and $Mg(OH)_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, saponite, and sepiolite. Suitable zinc, nickel, copper, iron, cobalt, manganese, calcium, and barium sources are the respective oxides, hydroxides, carbonates, nitrates, and chlorides.

Also mixtures of the above-mentioned divalent metal sources can be used, or doped divalent metal sources. Such doped metal sources are prepared by treatment of a divalent metal source metal source with a suitable dopant. An example of a doped divalent metal source is doped brucite.

If more than one divalent metal source is used they can be combined in the precursor mixture in any sequence and/or in any process step after the shaping step. If a divalent metal source is added after the shaping step, it is preferably in liquid when contacted with the shaped bodies. This can be done by dispersing or dissolving the divalent metal source and adding it to the shaped bodies.

The divalent metal source may be pre-treated prior to the addition to the precursor mixture and/or prior to the addition to the shaped bodies. Said pre-treatment may comprise a thermal and/or a hydrothermal treatment, an acid treatment, a base treatment, all optionally in the presence of a seed.

It is not necessary to convert all of the divalent metal source into crystalline anionic clay. For instance, any excess of magnesium compounds will usually be converted into brucite or magnesia. For the sake of clarity, this excess of magnesium compounds in the shaped particle will be referred to in this description as magnesia. The presence of magnesia in the shaped body may provide desirable functionalities to the shaped bodies such as for instance metal trap capacity. The presence of magnesia provides basic sites which render the shaped body suitable for treating strong acid streams of gases or liquids to remove or neutralise undesirable acid components.

The shaped bodies containing anionic clay, anionic clay and magnesia or anionic clay and alumina may be used in processes involving purification and/or separation or organic compounds in hydrocarbon streams, e.g. the removal of S-compounds and/or N-compounds in the gasoline and diesel fraction in FCC and hydroprocessing. Further, the shaped bodies may be used in water treatment for removing organic and inorganic compounds for the purpose of purifying, clarifying, and separating undesirable compounds from said water streams, including ion-exchange processes. Also, the shaped bodies may be used in the treatment of gaseous streams in industrial processes to remove undesirable gaseous compounds such as chlorine, hydrochloric acid, sulphur compounds (e.g. SOx), nitrogen compounds (e.g. NOx, ammonia) and phosphorus compounds. In each case the shaped body is contacted with the stream in question at conditions appropriate for the operation being performed.

The various process steps will be described in more detail below.

Preparation of the Precursor Mixture

In this step a precursor mixture is prepared from a trivalent metal source and/or a divalent metal source in a liquid. All liquids are suitable, as long as they do not detrimentally interfere with the various sources. Suitable liquids are water, ethanol, and propanol. The amount of liquid can be chosen such that a mixture with a milky substance is obtained, but also mixtures with a higher viscosity, for instance doughs, are suitable. If more than one source is used for the precursor mixture, the sources can be added as solids, but they can also be added in liquid, provided that the combination of an aluminium and a magnesium source is excluded. The various sources can be added in any sequence.

The preparation of the precursor mixture can be carried out with or without stirring, at room temperature or elevated temperature. Optionally, the precursor mixture and/or the separate sources are homogenised by, for instance, milling, ultrasound treatment, or high shear mixing. Such treatments may also increase the reactivity and/or reduce the particle size of the metal source(s).

Some conversion to crystalline anionic clay may already take place upon combining the various sources. It is preferred that at least 5 wt % of the final total amount of anionic clay is already formed, but for the present invention it is essential that conversion also takes place after the shaping step. Usually more than 25 wt %, preferably more than 50 wt %, more preferably more than 75 wt % and most preferably between 80–95 wt % of the final amount of anionic clay in the shaped body is formed after the shaping step, because then shaped bodies with the highest physical strength are obtained.

The divalent to trivalent metal molar ratio within the anionic clay may vary from 1 to 10, preferably 1 to 6, most preferably 2 to 4.

If desired, organic or inorganic acids and bases, for example for control of the pH, may be added to the precursor mixture or added to any one of the trivalent metal source and/or divalent metal source before these are added to the precursor mixture. An example of a preferred modifier is an ammonium base, because upon drying no deleterious cations remain in the anionic clay.

As mentioned above, the precursor mixture may be pre-aged prior to the shaping step. The pre-aging temperature may range from 30° to 500° C. and it may be conducted under atmospheric or increased pressure such as autogeneous pressure at temperatures above 100° C. The aging time can vary from 1 minute to several days, for instance 7 days.

By adding specific anions to the precursor mixture and/or any of the trivalent metal and/or divalent metal sources the interlayer-charge balancing anions present may be controlled. Usually, the pH must be controlled to introduce the desired form of the interlayer charge balancing anion, many charge balancing anions being pH-dependent. Examples of suitable anions are carbonate, bicarbonate, nitrate, chloride, sulphate, bisulphate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{-6}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$, $HGaO_3^{2-}$, $CrO_4^{2-}$, and Keggin-ions, formates, acetate, and mixtures thereof. It is believed that the presence of some of these anions such as carbonate, bicarbonate, sulphate and or nitrate influences the formation of side products such as brucite. Further, the addition of ammonium hydroxide promotes meixnerite formation, whereas the addition of ammonium carbonate promotes hydrotalcite formation. It goes without saying that in those cases wherein a specific anion is preferred in the anionic clay the reaction conditions in the further preparation steps must be adapted so as to avoid exchange of the anion by other less preferred anions.

Shaping

Suitable shaping methods include spray-drying, pelletising, granulation, extrusion (optionally combined with kneading), beading, or any other conventional shaping method used in the catalyst and absorbent fields or combinations thereof. The amount of liquid present in the precursor mixture should be adapted to the specific shaping step to be conducted. To this end one may partially remove the liquid used in the precursor mixture and/or add additional or other liquid, and/or change the pH of the precursor mixture to make the precursor mixture gellable and thus suitable for shaping. Various additives commonly used in the various shaping methods such as extrusion additives may be added to the precursor mixture used for shaping.

Thermal Treatment

After shaping the shaped bodies may optionally be submitted to a thermal treatment. Such a treatment increases the physical strength of the particles. The thermal treatment can be conducted in an oxygen-containing atmosphere, a hydrogen-containing atmosphere, in an inert atmosphere or in steam at temperatures varying from 30° to 900° C. for a time ranging from a few minutes to 24 hours. As in, for instance, spray-drying a thermal treatment is inherently involved, a further thermal treatment may not be necessary.

Aging

In this step, the shaped bodies are immersed in a protic liquid or protic gaseous medium. During the aging step crystallization to crystalline anionic clay takes place. Suitable protic liquids or gaseous media are those in which the shaped bodies do not dissolve, such as water, ethanol, methanol, propanol, steam, gaseous water, and gaseous ethanol. Increasing the temperature and/or the pressure can reduce the aging time. Aging can be conducted under autogeneous conditions. The aging temperature may range from 30° to 500° C. The aging time can vary from 1 minute to several days, for instance 7 days. For some purposes it is advantageous to conduct several aging steps, optionally with intermediate drying steps, optionally followed by calcination steps. For instance, an aging step at a temperature below 100° C. may be followed by a hydrothermal aging step at a temperature above 100° C. and autogeneous pressure, or vice versa.

As will be described below in further detail, additives can be added before, after or during any aging step. By adding specific anions to the aging medium at controlled pH, the interlayer-charge balancing anions present can be controlled. Examples of suitable anions are carbonate, bicarbonate, nitrate, chloride, sulphate, bisulfate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{-6}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$, $HGaO_3^{2-}$, $CrO_4^{2-}$, and Keggin-ions, formate, acetate, and mixtures thereof. It is also believed that the presence of some of these anions such as carbonate, bicarbonate, sulphate, and/or nitrate influence the forming of side products such as brucite. Further, the addition of ammonium hydroxide promotes meixnerite-like clay formation, whereas the addition of ammonium carbonate promotes hydrotalcite-like clay formation.

For some applications it is desirable to have additives present in and/or on the shaped bodies according to the invention. Suitable additives include compounds of rare earth metals (especially Ce and La), Si, P, B, Bi, Group VI metals, Group VIII metals, noble metals such as Pt and Pd, alkaline earth metals (for instance Ca and Ba) and/or transition metals (for example Mn, Fe, Ti, V, W, Zr, Cu, Ni, Zn, Mo, Sn). The additives or their precursors can be added separately or in mixtures in any of the preparation steps of the invention. For instance, they can be deposited on the shaped bodies before, during, or after aging, or else they can be added to the precursor mixture and/or any of the trivalent metal or divalent metal sources. Suitable sources of metal compounds and non-metal compounds are oxides, halides such as chlorides, sulfates, nitrates, and phosphates. As mentioned above, the additives may be added in any of the preparation steps. This can be especially advantageous for controlling the distribution of the additives in the shaped bodies. It is even possible to calcine the shaped bodies, rehydrate them in the presence of anions, such $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$, $HGaO_3^{2-}$, $CrO_4^{2-}$, Keggin-ions, formate, acetate, and mixtures thereof. It is further possible to reduce, hydrogenate or sulphurize the metals after and/or during introduction.

With the help of additives the shaped bodies may be provided with desired functionalities, or the desired functionality may be increased by the addition of additives. The suitability of anionic clay-containing shaped bodies for the removal of SOx and/or NOx compounds in FCC may be improved by the addition of Ce and/or V. The presence of V, W, Mo and/or Zn improves the suitability for removal of S-compounds in the gasoline and diesel fraction of FCC. The presence of Zn and/or Mn improves metal trapping. As described above, these functionalities may also be built in by using and excess of trivalent metal source and/or divalent metal source. A combination of these measures increases the effect.

The crystalline anionic clay-containing bodies may also be prepared to contain conventional catalyst components such as matrix or filler materials (e.g. kaolin clay, phosphated kaolin, titanium oxide, zirconia, alumina, silica, silica-alumina, and bentonite), and molecular sieves (e.g. zeolite Y, USY zeolite, ion-exchanged zeolite, ZSM-5, beta-zeolite, and ST-5). These conventional catalyst components may be added prior to the shaping step. Because the anionic clay is formed in situ, the resulting body will have a homogeneous dispersion of anionic clay and catalyst components. With the method according to the invention, multiple-functional bodies can be prepared which can be used as a catalyst or as a catalyst additive.

The process according to the invention may be conducted batch-wise or in a continuous mode, optionally in a continuous multi-step operation. The process may also be conducted partly batch-wise and partly continuous.

If desired, the crystalline anionic clay-containing shaped bodies prepared by the process according to the invention may be subjected to ion-exchange, in which the interlayer charge-balancing anions of the clay are replaced with other anions. Said other anions are the ones commonly present in anionic clays and include pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$ $HGaO_3^{2-}$, $CrO_4^{2-}$, and Keggin-ions. Examples of suitable pillaring anions are given in U.S. Pat. No. 4,774,212, which is included by reference for this purpose. Said ion-exchange can be conducted as soon as the crystalline anionic clay has been formed.

The present invention is further directed to crystalline anionic clay-containing shaped bodies obtainable by the process according to the invention. As mentioned above, the shaped bodies appear to have high mechanical strength and attrition resistance, comparable with that of clay-containing bodies prepared by dispersing clay into a matrix or binder material and then shaping the clay-containing composition, yet without matrix or binder material having to be added to the crystalline anionic clay. This means that with the process according to the invention, crystalline anionic clay-containing shaped bodies can be prepared containing more than 25 wt %, preferably more than 50 wt %, more preferably more than 70 wt % or even more preferably more than 90 wt % crystalline anionic clay. Although binder material may be present in the shaped crystalline anionic clay containing bodies according to the invention, for instance as a result of an excess aluminium source present in the precursor mixture, any binder that is present in the shaped bodies according to the invention will be present as a discontinuous phase, as is depicted schematically in FIG. 1. This is in contrast to clay-containing bodies prepared in the conventional way, i.e. by embedding clay into a matrix or binder material, where the binder material in the bodies is present in a continuous phase, as is schematically depicted in FIG. 2. It is of course also possible to incorporate the crystalline anionic clay-containing shaped bodies into a matrix. In that case, composite particles are obtained which comprise crystalline anionic clay-containing shaped bodies with, optionally, binder material in a discontinuous phase, embedded in a binder material, as is schematically depicted in FIG. 3.

In FIG. 1 a schematic view is given of a shaped crystalline anionic clay-containing body (1) according to the present invention which comprises crystalline anionic clay (2) and binder material (3) in a discontinuous phase. In FIG. 2 a schematic view is given of a shaped crystalline anionic clay-containing body (1) according to the prior art which comprises crystalline anionic clay (2) and binder material (3) in a continuous phase.

In FIG. 3 a schematic view is given of a composite particle comprising crystalline anionic clay-containing shaped bodies (1) which comprise crystalline anionic clay (2) and binder material (3) in a discontinuous phase which are embedded in binder material (3') which is in a continuous phase.

During or prior to use in catalytic applications, anionic clays are often thermally treated to obtain so-called solid solutions or spinels. The present invention is also directed to shaped bodies and composite particles containing thermally treated anionic clay.

The invention is illustrated by the following Examples.

EXAMPLES

Example 1

Flash-calcined gibbsite, Cp grade, was slurried in water that contained zinc carbonate. The Zn:Al atom ratio was 2. The slurry was homogenized with shear mixing. The slurry was filtered and the filter cake was granulated to form shaped bodies. The shaped bodies were calcined at 250° C. for 4 hours. The calcined shaped bodies were slurried in water and aged at 65° C. for 6 hours. The pH of the slurry was adjusted to 6.5 with nitric acid. XRD analysis indicated the presence of Zn—Al hydrotalcite and some ZnO in the shaped bodies.

Example 2

Flash-calcined gibbsite, Cp grade, was slurried in water that contained iron (II) nitrate. The slurry was homogenized with shear mixing. The slurry was filtered and the filter cake was granulated to form shaped bodies. The shaped bodies were calcined at 250° C. for 4 hours. The calcined shaped bodies were slurried in water and aged at 65° C. for 18 hours. The pH of the slurry was adjusted to 9.5 with ammonium hydroxide. XRD analysis indicated the presence of Fe—Al hydrotalcite in the shaped bodies.

Example 3

Gallium nitrate was added to an aqueous slurry containing magnesium oxide. The slurry was homogenized with shear mixing and formed to shaped bodies by spray-drying. The shaped bodies were calcined at 250° C. for 4 hours. The calcined shaped bodies were slurried in water and aged at 65° C. for 18 hours. The pH of the slurry was adjusted to 9.5 with ammonium hydroxide. XRD analysis indicated the presence of Mg—Ga hydrotalcite in the shaped bodies.

Example 4

Aluminium trihydrate (46.5) was slurried in 466 g de-ionized water containing 389.6 g $Fe(NO_3)_2 \cdot 6H_2O$. The total amount of slurry was 976 g and had a solids content of 13 wt %. The resulting slurry was aged and the resulting product was granulated. The granules were aged hydrothermally at 175° C. for 2 hours. The product was dried overnight at 110° C. XRD showed the formation of Fe—Al anionic clay.

Example 5

Example 1 was repeated, except that cobalt nitrate being used instead of zinc carbonate. The process conditions were the same. The PXRD pattern of the final product indicated the formation of a Co—Al anionic clay.

Example 6

Ferric hydroxide was prepared by precipitation from a ferric nitrate solution. Ferrous hydroxide was precipitated from a ferrous nitrate solution by addition of ammonium hydroxide in an inert atmosphere of nitrogen. The two precipitates were combined and shear mixed. One half of the mixture was aged at 85° C. for 8 hours in a closed container. The other half was aged at 150° C. for 30 minutes. Both mixtures were filtered and the filter cake was granulated into shaped bodies. The shaped bodies were calcined at 200° C. for 4 hours and then rehydrated at 65° C. in water for 6 hours. The products were dried at 110° C. PXRD showed the formation of a $Fe^{3+}Fe^{2+}$-anionic clay in both products.

What is claimed is:

1. A process for the preparation of crystalline anionic clay-containing bodies from sources comprising a trivalent metal source and a divalent metal source comprising the steps of:

a) preparing a precursor mixture containing a liquid, at least one of a divalent metal source and a trivalent metal source, at least one of them being insoluble in the liquid;

b) shaping the precursor mixture to obtain shaped bodies; and c) aging the shaped bodies to obtain crystalline anionic clay-containing bodies;

with the proviso that if either of a divalent or trivalent metal source is not present in the precursor mixture of step a), such source is added to the shaped bodies after shaping step b) and before aging step c);

and with the further proviso that the combined use of an aluminium source as the trivalent metal source and a magnesium source as the divalent metal source is excluded.

2. The process of claim 1 wherein the shaped bodies are thermally treated between steps b) and c).

3. The process of claim 1 wherein additives are added in the aging step.

4. The process of claim 1 wherein the precursor mixture contains a divalent metal source and a trivalent metal source.

5. The process of claim 1 wherein the precursor mixture is pre-aged prior to shaping step b).

6. The process of claim 4 wherein in step a) a trivalent metal source and a magnesium source are combined to obtain a precursor mixture.

7. The process of claim 1 wherein the trivalent metal source is present in the precursor mixture and a divalent metal source is added after the shaping step b) and wherein the trivalent metal source is selected from the group consisting of oxides, hydroxides, carbonates, hydroxy carbonates and combinations thereof.

8. The process of claim 1 wherein a divalent metal source is present in the precursor mixture and a trivalent metal source is added after the shaping step b) and wherein the divalent metal source is selected from the group consisting of oxides, hydroxides, carbonates, hydroxy carbonates and combinations thereof.

9. The process of claim 1 wherein the trivalent metal source is selected from aluminium trihydrate, its thermally treated form or boehmite.

10. The process of claim 1 wherein the trivalent metal source comprises kaolin, phosphated kaolin, bentonite, metakaolin and/or bauxite.

11. The process of claim 1 wherein the divalent metal source comprises magnesium oxide.

12. The process of claim 1 wherein aging step c) comprises more than one step in which aging is conducted.

13. The process of claim 12 wherein there are intermediate drying steps between aging steps.

14. The process of claim 13 wherein one or more drying steps are followed by calcining.

15. The process of claim 1 wherein additives are added in step a).

16. The process of claim 1 wherein additives are added after the shaping step b).

17. The process of claim 12 wherein additives are added in any one of the aging steps.

* * * * *